(12) United States Patent
Kondo et al.

(10) Patent No.: US 11,390,343 B2
(45) Date of Patent: Jul. 19, 2022

(54) SEAT RAIL OF MOTORCYCLE

(71) Applicant: Suzuki Motor Corporation, Hamamatsu (JP)

(72) Inventors: Naokazu Kondo, Hamamatsu (JP); Masayasu Wakabayashi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 124 days.

(21) Appl. No.: 16/794,571

(22) Filed: Feb. 19, 2020

(65) Prior Publication Data
US 2020/0269942 A1 Aug. 27, 2020

(30) Foreign Application Priority Data

Feb. 22, 2019 (JP) .............................. JP2019-030661

(51) Int. Cl.
 *B62J 1/08* (2006.01)
 *B62J 25/00* (2020.01)
 *B62J 1/14* (2006.01)

(52) U.S. Cl.
CPC .. *B62J 1/08* (2013.01); *B62J 1/14* (2013.01); *B62J 25/00* (2013.01)

(58) Field of Classification Search
CPC ................. B62J 1/08; B62J 1/14; B62J 25/00
See application file for complete search history.

(56) References Cited

U.S. PATENT DOCUMENTS

| 10,710,665 | B2 * | 7/2020 | Matsuo | B62K 19/16 |
| 10,946,917 | B2 * | 3/2021 | Enami | B62J 1/08 |
| 2009/0008900 | A1 * | 1/2009 | Ishikawa | B62J 25/00 |
| | | | | 280/291 |
| 2015/0060177 | A1 * | 3/2015 | Matsushima | B62K 19/16 |
| | | | | 180/219 |

(Continued)

FOREIGN PATENT DOCUMENTS

| AT | 517927 A1 | 5/2017 |
| DE | 102018112469 A1 | 11/2018 |

(Continued)

OTHER PUBLICATIONS

German Office Action for Application No. 10 2020 102 695.1 dated Mar. 18, 2022, pp. 1-8.

*Primary Examiner* — Tony H Winner
(74) *Attorney, Agent, or Firm* — Lerner, David, Littenberg, Krumholz & Mentlik, LLP

(57) ABSTRACT

A seat rail of a motorcycle has two side members configured using fiber-reinforced resin. Each side member has a main body and an upper flange portion that protrudes in a width direction of a vehicle body from an upper side edge of the main body. An attachment element for attachment to the main frame of the vehicle body is provided at a front end portion of each side member, and the seat rail has at least one upper connecting member that connects two upper flange portions. The upper flange portion has an inflection section connecting the front section and the rear section such that the rear section of the upper flange portion is raised toward an upper direction with respect to the front section, and the inflection section is arranged between the front end portion of the side member and a foremost upper connecting member.

7 Claims, 3 Drawing Sheets

(56) References Cited

U.S. PATENT DOCUMENTS

| | | | |
|---|---|---|---|
| 2015/0367904 A1* | 12/2015 | Yoshida | B62K 11/02 |
| | | | 280/281.1 |
| 2016/0200387 A1* | 7/2016 | Matsushima | B62K 11/04 |
| | | | 180/219 |
| 2018/0339739 A1* | 11/2018 | Kondo | B62J 1/08 |
| 2019/0300086 A1* | 10/2019 | Enami | B62J 1/08 |

FOREIGN PATENT DOCUMENTS

| | | |
|---|---|---|
| EP | 1964759 A1 | 9/2008 |
| EP | 2055618 A1 | 5/2009 |
| WO | 2015033425 A1 | 3/2015 |

\* cited by examiner

SEAT RAIL OF MOTORCYCLE

CROSS-REFERENCE TO RELATED APPLICATIONS

The present application claims the benefit of Japanese Patent Application No. 2019-030661, filed on Feb. 22, 2019, the disclosure of which is hereby incorporated herein by reference.

BACKGROUND OF THE INVENTION

Technical Field

The present invention relates to a seat rail of a motorcycle, having two side members arranged with an interval in a width direction of a vehicle body of a motorcycle, the seat rail configured such that a front end portion of each side member is attached to a main frame of the vehicle body.

Background Art

A seat rail for supporting a seat is provided in a motorcycle. Typically, the seat rail has two side members arranged with an interval in a width direction of a vehicle body of a motorcycle, and a front end portion of each side member is attached to a main frame of the vehicle body. This seat rail may be configured using fiber-reinforced resin.

As an example of the seat rail, the seat rail configured such that a seat rail which supports a riding seat (a rear frame), is formed of fiber-reinforced resin, this seat rail is connected to a main frame (a front frame) which supports an engine to extend rearward from this main frame, the seat rail has two right and left side walls, an insertion hole for inserting a bolt is formed at a front end portion of each side wall, and furthermore, by the bolt inserted into the insertion hole, the seat rail is fastened to the main frame, can be cited (for example, see International Patent Application Publication WO 2015/033425 A1.)

BRIEF SUMMARY OF THE INVENTION

Technical Problem

In driving a motorcycle on a rough road or the like, a large load is applied to a seat rail by a rider or a loaded object etc. However, in the seat rail made of fiber-reinforced resin as in the example, there is a risk of creep deformation of the resin, and thus, to prevent such creep deformation, it is difficult to sufficiently secure an axial force of a fastening element. In such a state in which the axial force of the fastening element cannot be secured, the seat rail and the main frame may be easily misaligned due to an external force. Furthermore, due to this misalignment, an inner peripheral surface of the insertion hole at a fastening portion of the seat rail fastened to the main frame, may contact to an outer peripheral surface of an inserting portion of the fastening element, such as a screw portion of the bolt. As a result, caused by this contact, a local stress concentration may occur at a periphery of the fastening portion of the seat rail. Furthermore, such stress concentration may lower strength of the seat rail.

Accordingly, in the seat rail of the motorcycle, it is desired to inhibit the local stress concentration of the fastening portion of the seat rail fastened to the main frame. Furthermore, in the seat rail of the motorcycle, it is desired to effectively improve strength of the seat rail.

Solution to the Problem

To solve the problem, according to one aspect of the present invention, there is provided a seat rail of a motorcycle, including two side members which are arranged with an interval in a width direction of a vehicle body of the motorcycle and are configured using fiber-reinforced resin, each side member includes: a main body located outside in the width direction of the vehicle body; and an upper flange portion which protrudes in the width direction of the vehicle body from an upper side edge, in an upper-lower direction of the vehicle body, of the main body, furthermore, at a front end portion in a front-rear direction of the vehicle body in each side member, an attachment element which mounts this side member to a main frame of the vehicle body is provided, the seat rail includes at least one upper connecting member extending to connect upper flange portions of the two side members, the upper flange portion of each side member includes: a front section and a rear section respectively located near a front side and a rear side of the vehicle body; and an inflection section which connects the front section and the rear section such that the rear section of the upper flange portion is raised in an upper direction of the vehicle body with respect to the front section, and the inflection section of the upper flange portion of each side member is arranged between the front end portion of the side member and a foremost upper connecting member, in the front-rear direction of the vehicle body, of the at least one upper connecting member.

Advantageous Effects of the Invention

In the seat rail of the motorcycle according to one aspect, a local stress concentration of a fastening portion of the seat rail fastened to the main frame can be inhibited, and thus, in the seat rail of the motor cycle according to one aspect, strength of the seat rail can be efficiently improved.

DETAILED DESCRIPTION

Figure 3:
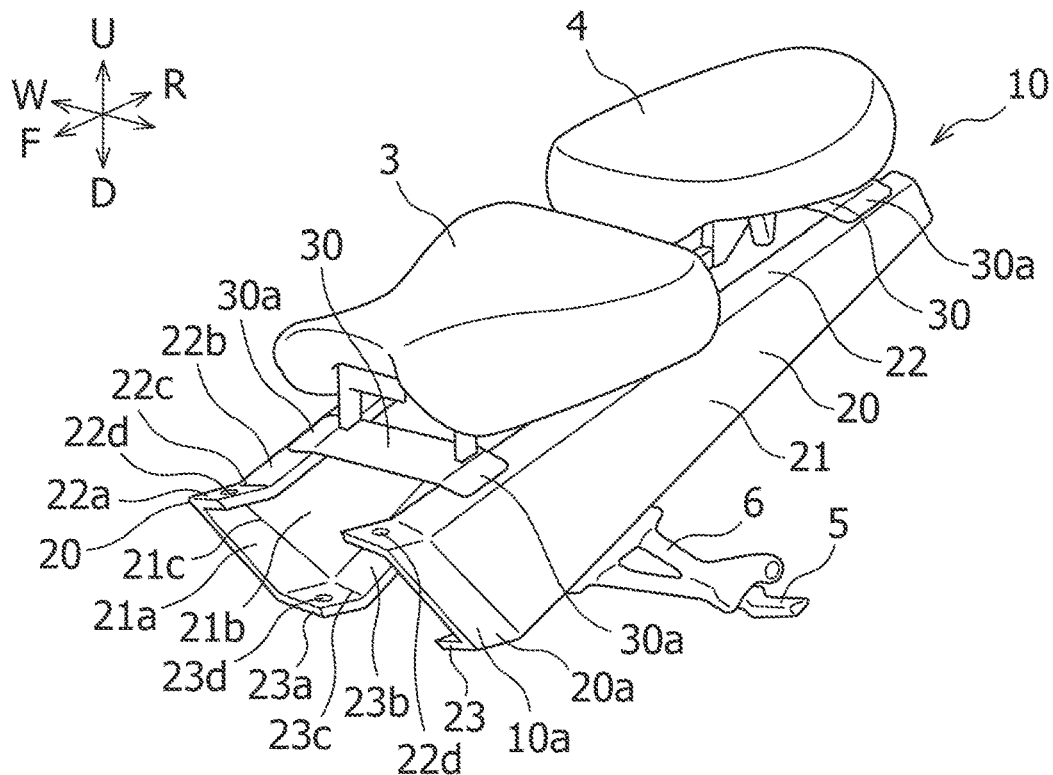
FIG. 3 is a perspective view schematically showing the seat rail according to the embodiment of FIG. 1 in a state that the main seat and the pillion seat are mounted.
Figure 4:
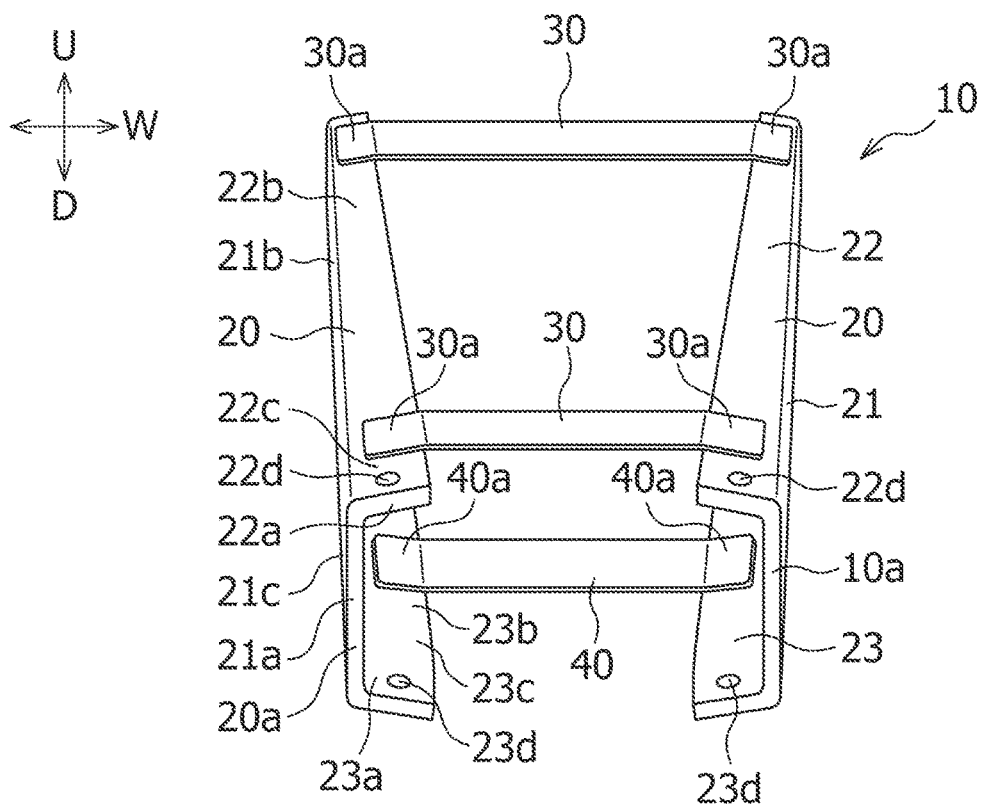
FIG. 4 is a front view schematically showing the seat rail according to the embodiment of FIG. 1.
Figure 5:
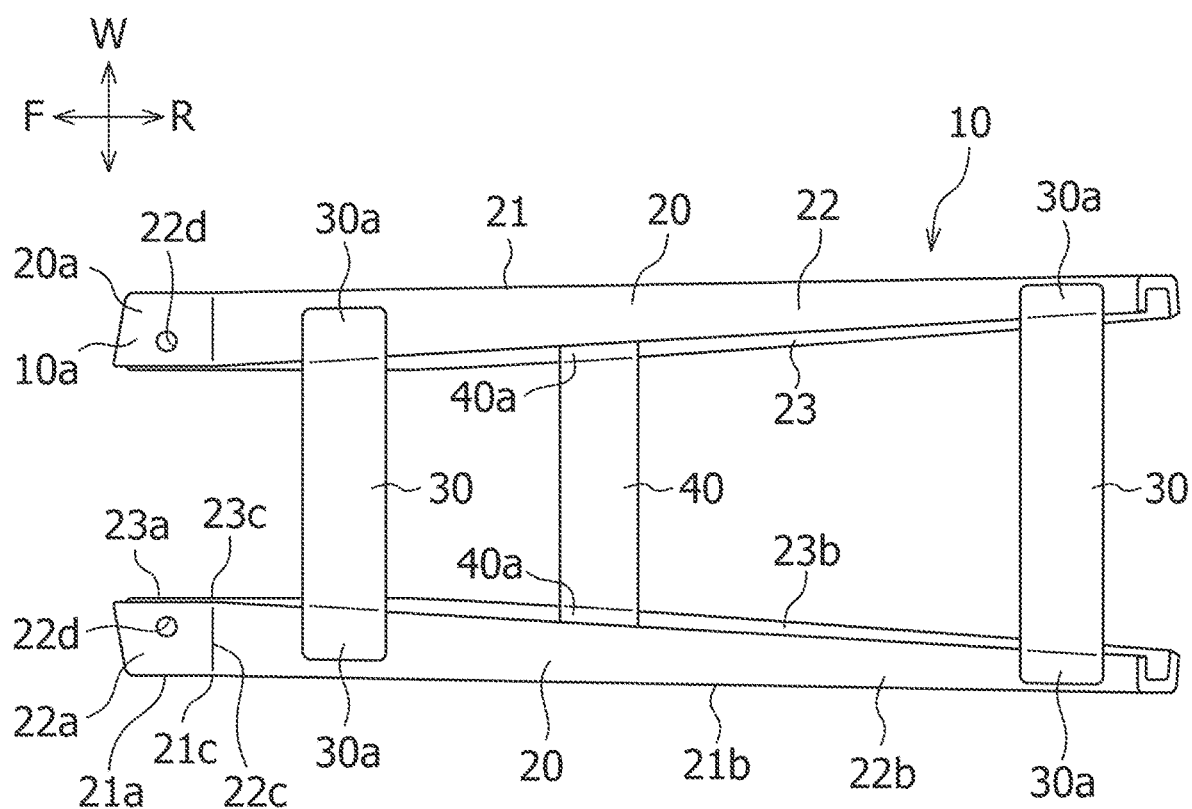
FIG. 5 is a plan view schematically showing the seat rail according to the embodiment of FIG. 1.

A seat rail according to an Embodiment is explained using a motorcycle having this seat rail. Additionally, in FIGS. 1 to 3 and 5 used for explanation in this Embodiment, a front direction of a vehicle body of the motorcycle is shown by an arrow F, and a rear direction of the vehicle body of the motorcycle is shown by an arrow R. In other words, the front-rear direction of the vehicle body is shown by the arrow F and the arrow R. In FIGS. 3 to 5, a width direction of the vehicle body (hereinafter, it is referred to as "a width direction") is shown by a double-headed arrow W. In FIGS.

1 to 4, an upper side of the vehicle body is shown by an arrow U, and a lower side of the vehicle body is shown by an arrow D. The upper-lower direction of the vehicle body is shown by the arrow U and the arrow D.

Outline of Seat Rail of Motorcycle

Figure 1:
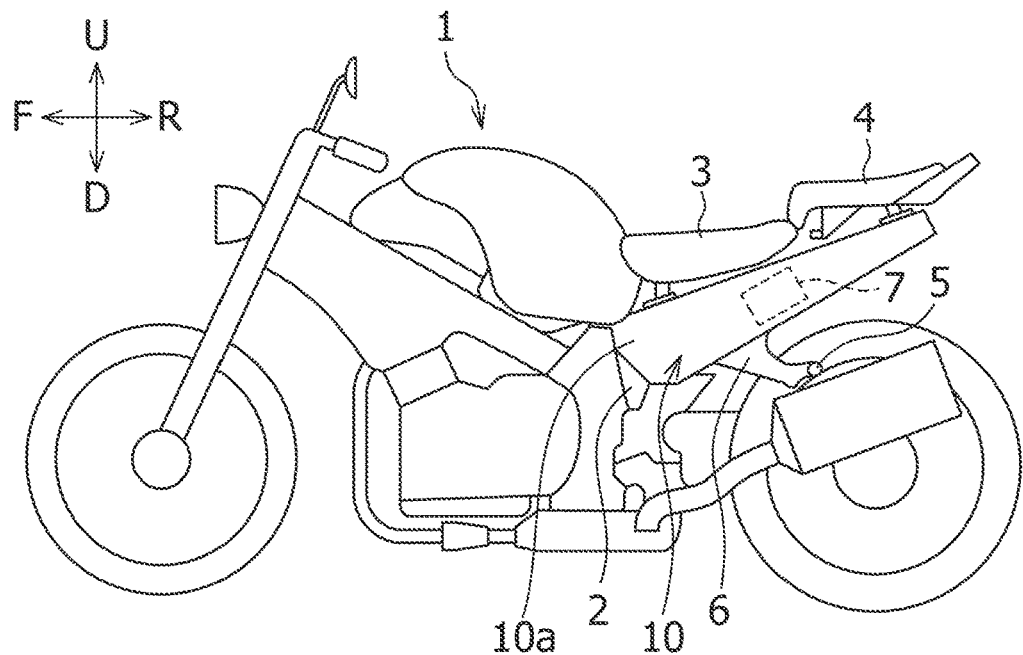
FIG. 1 is a side view schematically showing a motorcycle which has a seat rail according to an exemplary embodiment.

An outline of a seat rail 10 of a motorcycle 1 is explained with reference to FIGS. 1 to 5. First, an outline of the motorcycle 1 is described. As shown in FIG. 1, the motorcycle 1 includes: a main frame 2 constituting its vehicle body; a main seat 3 on which a rider (a front-seat driver) (not shown) is seated; a pillion seat 4 on which a pillion rider (a backseat passenger) (not shown) is seated; a pillion footrest 5; a bracket 6 for mounting this pillion footrest 5; and a battery 7 (shown by a dotted line). This motorcycle 1 has the seat rail 10 according to this Embodiment. A front end portion 10a of the seat rail 10 is mounted to the main frame 2.

Next, an outline of the seat rail 10 is described. As shown in FIGS. 2 to 5, the seat rail 10 has two side members 20 arranged with an interval in the width direction of the vehicle body. Each side member 20 is configured using fiber-reinforced resin. Each side member 20 has a main body 21 positioned outside in the width direction of the vehicle body. Each side member 20 has an upper flange portion 22 which protrudes in the width direction of the vehicle body from an upper side edge, in the upper-lower direction of the vehicle body, of the main body 21.

Figure 2:
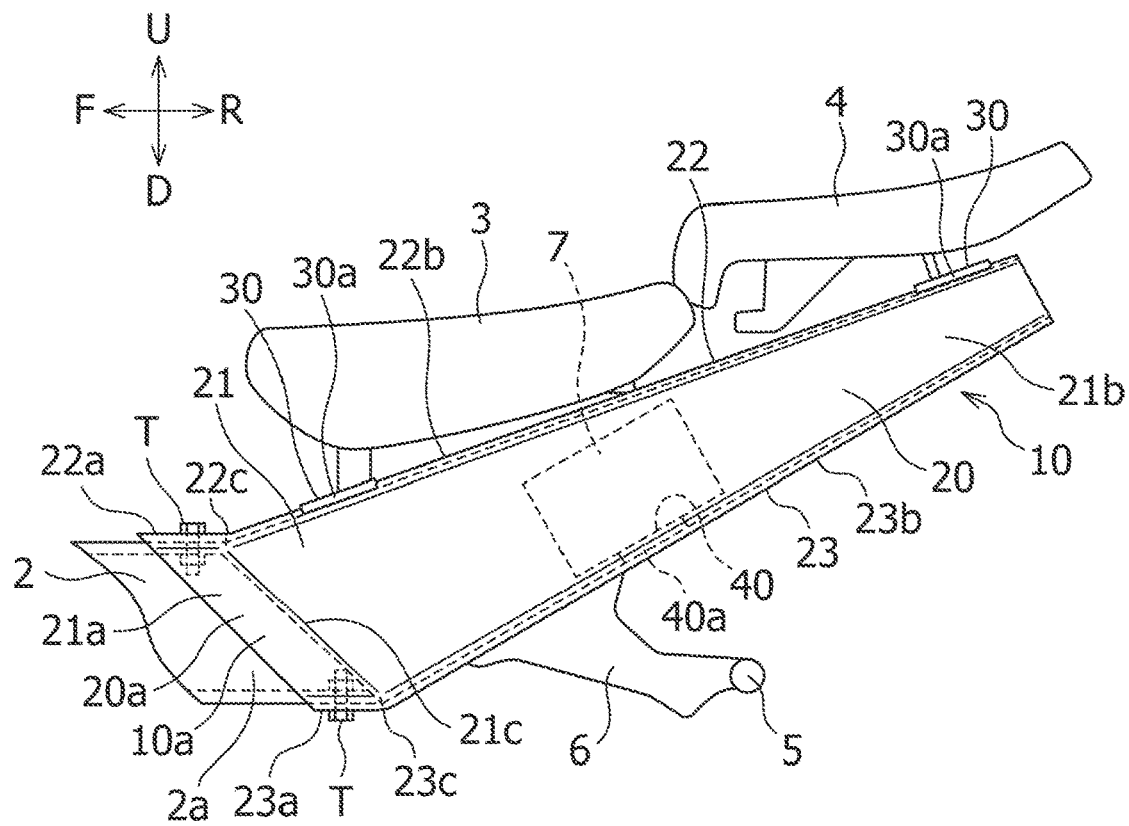
FIG. 2 is a side view schematically showing the seat rail according to the embodiment of FIG. 1 together with a main frame of a vehicle body in a state that a main seat, a pillion seat, and a battery are mounted.

As shown in FIGS. 1 and 2, a fastening element T configured as an attachment element for mounting the side member 20 to the main frame 2, is provided at a front end portion 20a, in the front-rear direction of the vehicle body, of each side member 20. The fastening element T is constituted by a bolt and a nut, and the bolt and the nut are screwed together. However, such attachment element may be a fastening element other than one constituted by a bolt and a nut, a joining element, and an attachment element other than a fastening element and a joining element, etc.

As shown in FIGS. 2 to 5, the seat rail 10 has at least one upper connecting member 30 extending so as to connect the upper flange portions 22 of two side members 20. Additionally, in FIGS. 2 to 5, as one example, the seat rail 10 having two upper connecting members 30 is shown. However, the present invention is not limited to this.

The upper flange portion 22 of each side member 20 has a front section 22a and a rear section 22b respectively located near a front side and a rear side of the vehicle body. The upper flange portion 22 of each side member 20 has an inflection section 22c connecting the front section 22a and the rear section 22b such that the rear section 22b of the upper flange portion 22 is raised in an upper direction of the upper-lower direction of the vehicle body with respect to the front section 22a.

The inflection section 22c of the upper flange portion 22 of each side member 20 is arranged between the front end portion 20a of the side member 20 and a foremost upper connecting member 30, in the front-rear direction of the vehicle body, of at least one upper connecting member 30. Additionally, the front end portion 20a of each side member 20 is located at a front end portion 10a of the seat rail 10.

Furthermore, the outline of the seat rail 10 according to this Embodiment may be as follows. As shown in FIG. 4, the main body 21 of each side member 20 and the upper flange portion 22 intersect at an angle greater than about 90 degrees. As shown in FIGS. 2 to 5, each side member 20 has a lower flange portion 23 which protrudes in the width direction of the vehicle body from a lower side edge, in the upper-lower direction of the vehicle body, of the main body 21 of the side member 20. The bracket 6 which supports the pillion footrest 5, is attached to the lower flange portion 23 of each side member 20.

As shown in FIGS. 2, 4 and 5, the seat rail 10 has at least one lower connecting member 40 extending so as to connect the lower flange portions 23 of two side members 20. Additionally, in FIGS. 2 to 5, as one example, the seat rail 10 having one lower connecting member 40, is shown. However, the present invention is not limited to this.

As shown in FIGS. 2 to 5, the lower flange portion 23 of each side member 20 has a front section 23a and a rear section 23b respectively located near the front side and the rear side of the vehicle body. The lower flange portion 23 of each side member 20 has an inflection section 23c connecting the front section 23a and the rear section 23b such that the rear section 23b of the lower flange portion 23 is raised in an upper direction of the vehicle body with respect to the front section 23a.

As shown in FIGS. 2, 4 and 5, the inflection section 23c of the lower flange portion 23 of each side member 20 is located between the front end portion 20a of the side member 20 and the bracket 6 in a case in which the foremost lower connecting member 40 is located at the rear of the vehicle body relative to the bracket 6 attached to the lower flange portion 23. However, the present invention is not limited to this, and the inflection section of lower flange portion of each side member is located between the front end portion of the side member and the foremost lower connecting member in a case in which the foremost lower connecting member is located at the front of the vehicle body relative to the bracket attached to the lower flange portion.

As shown in FIG. 4, the main body 21 of each side member 20 and the lower flange portion 23 intersect at an angle greater than about 90 degrees. As shown in FIG. 2, the above-described fastening element T is provided to each of the upper flange 22 and the lower flange 23.

As shown in FIGS. 4 and 5, a length, in the width direction of the vehicle body, of at least one of the upper flange portion 22 and the lower flange portion 23 of each side member 20 decreases as it goes to the rear side from the front side of the vehicle body. Additionally, in FIGS. 4 and 5, a length, in the width direction of the vehicle body, of each of the upper flange portion 22 and the lower flange portion 23 of two side members 20 decreases as it goes to the rear side from the front side of the vehicle body. However, the present invention is not limited to this.

At least one of: at least one upper connecting member 30; and at least one lower connecting member 40 is joined to two side members 20 by welding. In other words, at least one upper connecting member 30 is joined to the upper flange portions 22 of two side members 20 by welding, and/or at least one lower connecting member 40 is joined to the lower flange portions 23 of two side members 20 by welding. As described later, when each side member 20, and at least one of the upper connecting member 30 and the lower connecting member 40 are configured using fiber-reinforced resin including thermoplastic resin, each side member 20 can be joined to at least one of the upper connecting member 30 and the lower connecting member 40 by vibration welding or ultrasonic welding etc. However, the present invention is not limited to this. For example, each side member and at least one of the upper connecting member and the lower connecting member can be integrally formed by injection molding etc.

Details of Seat Rail of Motorcycle

The details of the seat rail 10 of the motorcycle 1 are explained with reference to FIGS. 1 to 5. In other words, the details of the seat rail 10 may be as follows. The upper connecting member 30 and the lower connecting member 40 are configured using fiber-reinforced resin.

The fiber-reinforced resin respectively used for the side member 20 and the upper connecting member 30 as well as the lower connecting member 40 may be any of continuous fiber-reinforced resin and discontinuous fiber-reinforced resin. The fiber-reinforced resin includes a predetermined resin material and a plurality of fibers. As a resin material for the fiber-reinforced resin, thermoplastic resin or thermosetting resin may be used. As thermoplastic resin, for example, polyamide, polypropylene etc. can be used. As thermosetting resin, for example, epoxy resin, phenolic resin etc. can be used. As a fiber for the fiber-reinforced resin, carbon fiber, glass fiber, aramid fiber, polyamide fiber, polyethylene fiber etc. can be used. However, the fiber-reinforced resin is not limited to this. The fiber-reinforced resin used for the side member 20 and the upper connecting member 30 as well as the lower connecting member 40 may be the same or different.

As shown in FIGS. 2 to 5, the main body 21 of each side member 20 has a front section 21a and a rear section 21b respectively located near the front side and the rear side of the vehicle body. The main body 21 of each side member 20 has an inflection section 21c connecting the front section 21a and the rear section 21b such that the rear section 21b of the main body 21 is raised in an upper direction of the vehicle body with respect to the front section 21a. As shown in FIGS. 2 to 3, a length, in the upper-lower direction of the vehicle body, of the rear section 21b of the main body 21 decreases as it goes to the rear side from the front side of the vehicle body.

As shown in FIGS. 2 to 5, the front section 21a of the main body 21 of each side member 20 is located between the front sections 22a, 23a of the upper flange portion 22 and the lower flange portion 23 of the side member 20. The rear section 21b of the main body 21 of each side member 20 is located between the rear sections 22b, 23b of the upper flange portion 22 and the lower flange portion 23 of the side member 20. The inflection section 21c of the main body 21 of each side member 20 is located between the inflection sections 22c, 23c of the upper flange portion 22 and the lower flange portion 23 of the side member 20.

The upper flange portion 22 protrudes from an upper side edge of the main body 21 toward a center in the width direction of the vehicle body. The upper flange portion 22 is inclined from the lower side to the upper side of the vehicle body as it goes to a center from outside in the width direction of the vehicle body. The lower flange portion 23 protrudes from a lower side edge of the main body 21 toward the center in the width direction of the vehicle body. The lower flange portion 23 is inclined from the upper side to the lower side of the vehicle body as it goes to the center from outside in the width direction of the vehicle body.

Each of the front sections 21a, 22a, 23a is located along the front-rear direction of the vehicle body. Each of the rear sections 21b, 22b, 23b extends in the rear direction of the vehicle body from the inflection sections 21c, 22c, 23c connected to the rear sections 21b, 22b and 23b. Each of the rear sections 21b, 22b, 23b is inclined from the lower side to the upper side of the vehicle body as it goes to the rear side from the front side of the vehicle body. Each of the inflection sections 21c, 22c and 23c is formed to be inflective. However, the present invention is not limited to this, and each of the inflection sections may be formed to be curved.

Both side end portions 30a, in the width direction of the vehicle body, of the upper connecting member 30 are respectively inclined along the upper flange portions 22 of two side members 20. Such both side end portions 30a of the upper connecting member 30 are respectively joined to an upper surface of the upper flange portion 22. As shown in FIGS. 2, 4 and 5, both side end portions 40a, in the width direction of the vehicle body, of the lower connecting member 40 are respectively inclined along the lower flange portions 23 of two side members 20. Such both side end portions 40a of the lower connecting member 40 are respectively joined to an upper surface of the lower flange portion 23.

As shown in FIG. 2, the foremost upper connecting member 30 supports the main seat 3. The last upper connecting member 30 in the front-rear direction of the vehicle body supports the pillion seat 4. The lower connecting member 40 supports the battery 7.

As shown in FIG. 2, a rear end portion 2a, in the front-rear direction of the vehicle body, of the main frame 2 is positioned between the front end portions 20a of two side members 20. Such rear end portion 2a of the main frame 2 is attached to the front end portion 20a of two side members 20.

As shown in FIGS. 3 to 5, in the front section 22a of the upper flange portion 22, an insertion hole 22d penetrating in the upper-lower direction of the vehicle body to allow the bolt of the fastening element T to be inserted, is formed. In the front section 23a of the lower flange portion 23, an insertion hole 23d penetrating in the upper-lower direction of the vehicle body to allow the bolt of the fastening element T to be inserted, is formed. As shown in FIG. 2, the fastening members T are respectively arranged at each of the front sections 22a, 23a of the upper flange portion 22 and the lower flange portion 23. Each fastening element T fastens the front sections 22a, 23a on which the fastening element T is arranged, to a portion of the main frame 2 to which the front sections 22a, 23a are attached, in the upper-lower direction of the vehicle body.

As described above, in the seat rail 10 according to this Embodiment, typically, the foremost upper connecting member 30 supports the main seat 3 on which the rider is seated. Consequently, a large downward load is applied to the foremost upper connecting member 30 from the rider. In this case, a stress is concentrated on a region between the foremost upper connecting member 30 and the front end portion 20a of each side member 20 to which the main frame 2 of the vehicle body is attached. On the other hand, since the inflection section 22c of the upper flange portion 22 of each side member 20 is arranged between the front end portion 20a of the side member 20 and the foremost upper connecting member 30, the stress can be dispersed on the inflection section 22c, and concentration of the stress at and a periphery of the fastening element T of the front end portion 20a of each side member 20, can be inhibited. Therefore, a local stress concentration at a fastening portion of the seat rail 10 to be fastened to the main frame 2, can be inhibited, and thus, strength of the seat rail 10 can be effectively improved. Additionally, the upper flange portion 22 of each side member 20 and the upper connecting member 30 can be used for attachment of a hook or a fender brace etc. (not shown) for holding the main seat 3 or the pillion seat 4. Furthermore, the inflection section 22c of the upper flange portion 22 of each side member 20 can also be used for positioning when the seat rail 10 is attached to the main frame 2.

In the seat rail 10 according to this Embodiment, the main body 21 and upper flange portion 22 of each side member 20 intersect at an angle greater than about 90 degrees. Accordingly, even in a case in which the side member 20 is configured using CFRP (carbon fiber reinforced resin) and water is clings to the upper flange portion 22 of the side member 20, the water flows downward, and thus, retention of water in the side member 20 can be prevented, and corrosion of the side member 20 due to water can be prevented. As a result, strength of the seat rail 10 can be effectively improved.

In the seat rail 10 according to this Embodiment, typically, the foremost lower connecting member 40 supports the battery 7. Consequently, a large downward load is applied to the foremost lower connecting member 40 from the battery 7. Typically, a large downward load is applied to the pillion footrest 5 from the pillion rider. In this case, a stress is concentrated on a region between the foremost lower connecting member 40 or the pillion footrest 5 and the front end portion 20a of each side member 20 to which the main frame 2 of the vehicle body is attached. On the other hand, since the inflection section 23c of the lower flange portion 23 of each side member 20 is arranged between the front end portion 20a of the side member 20 and the foremost lower connecting member 40, the stress can be dispersed on the inflection section 23c, and concentration of the stress at and a periphery of the fastening element T of the front end portion 20a of each side member 20, can be inhibited. Due to this, a local stress concentration at a fastening portion of the seat rail 10 to be fastened to the main frame 2, can be inhibited, and thus, strength of the seat rail 10 can be effectively improved. Additionally, the inflection section 23c of the lower flange portion 23 of each side member 20 can also be used for positioning when the seat rail 10 is attached to the main frame 2.

In the seat rail 10 according to this Embodiment, the main body 21 and lower flange portion 23 of each side member 20 intersect at an angle greater than about 90 degrees. Accordingly, even in a case in which the side member 20 is configured using CFRP and water is attached to the lower flange portion 23 of the side member 20, the water flows downward, thus, retention of water in the side member 20 can be prevented, and corrosion of the side member 20 due to water can be prevented. As a result, strength of the seat rail 10 can be effectively improved.

In the seat rail 10 according to this Embodiment, the fastening members T are provided to each of the upper flange portion 22 and the lower flange portion 23. Consequently, the attachment members T of the upper flange portion 22 and the lower flange portion 23 have high strength to a vertical load generated in driving the motorcycle 1 on a rough road or the like, so that strength of the seat rail 10 can be effectively improved.

In the seat rail 10 according to this Embodiment, the length, in the width direction of the vehicle body, of at least one of the upper flange portion 22 and the lower flange portion 23 of each side member 20 decreases as it goes to the rear side from the front side of the vehicle body. In the seat rail 10, necessity of improving strength is increased as it goes to the front side from the rear side in the front-rear direction of the vehicle body, so that strength of the seat rail 10 can be effectively improved by at least one of the upper flange portion 22 and the lower flange portion 23.

In the seat rail 10 according to this Embodiment, at least one connecting member 30, 40 of at least one upper connecting member 30 and at least one lower connecting member 40, is joined to two side members 20 by welding.

In a case in which at least one connecting member 30, 40 and two side members 20 are joined by welding, compared to a case in which joining is executed using an additional member such as a bolt, strength of the seat rail 10 can be effectively improved while preventing increase of a weight of the vehicle body.

While the Embodiment of the present invention has been explained so far, the present invention is not limited to the Embodiment described above. The present invention can be varied and modified based on its technical concept.

REFERENCE SIGNS LIST

1 . . . Motorcycle
2 . . . Main frame
5 . . . Pillion footrest
6 . . . Bracket
10 . . . Seat rail
20 . . . Side member
20a . . . Front end portion
21 . . . Main body
22 . . . Upper flange portion
22a . . . Front section
22b . . . Rear section
22c . . . Inflection section
23 . . . Lower flange portion
23a . . . Front section
23b . . . Rear section
23c . . . Inflection section
30 . . . Upper connecting member
40 . . . Lower connecting member
T . . . Fastening element (Attachment element)

The invention claimed is:

1. A seat rail of a motorcycle, comprising two side members which are arranged with an interval in a width direction of a vehicle body of the motorcycle and are configured using a fiber-reinforced resin, wherein
  each side member includes a main body located outside in the width direction of the vehicle body, and an upper flange portion which protrudes in the width direction of the vehicle body from an upper side edge, in an upper-lower direction of the vehicle body, of the main body,
  at a front end portion, in a front-rear direction of the vehicle body, of each side member, an attachment element which mounts the side member to a main frame of the vehicle body, is provided,
  the seat rail comprises a plurality of upper connecting members extending so as to connect upper flange portions of the two side members,
  the upper flange portion of each side member includes a front section and a rear section respectively located close to a front and a rear of the vehicle body, and an inflection section which connects the front section and the rear section such that the rear section of the upper flange portion is raised toward an upper direction of the vehicle body with respect to the front section, and
  the inflection section of the upper flange portion of each side member is arranged between the front end portion of the side member and a foremost upper connecting member, in the front-rear direction of the vehicle body, of the a plurality of upper connecting members.

2. The seat rail of a motorcycle according to claim 1, wherein the main body of each side member and the upper flange portion thereof intersect at an angle greater than 90 degrees.

3. The seat rail of a motorcycle according to claim 1, wherein each side member includes a lower flange portion which protrudes in the width direction of the vehicle body from a lower side edge, in the upper-lower direction of the vehicle body, of the main body of the side member, a bracket which supports a pillion footrest, is attached to the lower flange portion of each side member, the seat rail has a plurality of lower connecting members extending to connect lower flange portions of the two side members, the lower flange portion of each side member includes a front section and a rear section respectively located close to the front and the rear of the vehicle body, and an inflection section which connects the front section and the rear section such that the rear section of the lower flange portion is raised in an upper direction of the vehicle body with respect to the front section, and the inflection section of the lower flange portion of each side member is located between the front end portion of the side member and a foremost lower connecting member, in the front-rear direction of the vehicle body, of the a plurality of lower connecting members, or the bracket.

4. The seat rail of a motorcycle according to claim 3, wherein the main body of each side member and the lower flange portion thereof intersect at an angle greater than 90 degrees.

5. The seat rail of a motorcycle according to claim 3, wherein the attachment element is provided in each of the upper flange portion and the lower flange portion.

6. The seat rail of a motorcycle according to claim 1, wherein a length, in the width direction of the vehicle body, of at least one of the upper flange portion and the lower flange portion of each side member decreases as it goes to the rear from the front of the vehicle body.

7. The seat rail of a motorcycle according to claim 3, wherein at least one of the plurality of upper connecting members and the plurality of lower connecting members is joined to the two side members by welding.

* * * * *